United States Patent Office 3,238,163
Patented Mar. 1, 1966

3,238,163
DYE RECEPTIVE POLYOLEFIN COMPOSITIONS COMPRISING A MAGNESIUM OR ZINC COMPOUND AND A HYDROXY SUBSTITUTED BENZOPHENONE
William Alexander O'Neill, James Walter Stimpson, and John Mather, all of Harrogate, England, assignors to Imperial Chemical Industries Limited, London, England, a corporation of Great Britain
No Drawing. Filed June 18, 1962, Ser. No. 203,009
Claims priority, application Great Britain, June 30, 1961, 23,717/61
9 Claims. (Cl. 260—23)

This application relates to the stabilisation of poly-α-olefines towards light and particularly to the protection of polypropylene and coloured articles thereof.

In the specification of our cognate co-pending United States application Serial No. 174,255 filed February 19, 1962, we disclose a method for dyeing polypropylene fibre in which inter alia an anionic exchange or basic substance is incorporated into the fibre and the fibre is then dyed with an acidic dyestuff having a low degree of ionisation. In general, dyeings on polypropylene have poor light fastness compared with comparable dyeings of other fibres. In addition, polypropylene itself has poor light stability in the absence of suitable protectors. The addition of ultra-violet absorbers either to the polymer or to the fibre is known. In melt spinning, however, there is a danger of the ultra-violet absorbers decomposing or alternatively of diffusing out of the extruded filaments ("blooming") and while incorporation into fibres is possible, the uptake is often small and the absorber is readily removed by washing.

We now provide a method whereby certain U.V. absorbing substances can be provided in articles of poly-α-olefines without any danger of "blooming" or of the absorber being removed by water or other solvent. In addition, high concentrations of the absorber can be maintained within the fibre to give adequate light stabilisation. Accordingly, our invention provides a process for the production of stabilised shaped articles of poly-α-olefines, particularly stereo-regular polypropylene, containing an anionic exchange or basic substance and characterised by the further incorporation of an acidic ultra-violet absorbing agent having a low degree of ionisation as hereinafter defined. By anionic exchange or basic substance is meant a substance which will react with an acid either directly or by replacement of the anion of the exchange substance by the anion of the acid. The incorporated substance may be dissolved wholly or in part in the polyolefin or it may be present in the form of finely dispersed particles or globules or it may be present in the form of a protective outer layer on the polyolefin structure. By an acidic ultra-violet absorbing substance having a low degree of ionisation we mean a substance which absorbs light in the region between about 3,500 and 4,000 A. and which is less than ten percent ionised in normal aqueous solution at 20° C.

The composition from which the article is formed may be conveniently prepared by adding the anionic exchange or basic substance to the polyolefin immediately before the shaping process is carried out but the substance may also be introduced at any stage in the manufacture of the polyolefin or by treatment of the shaped article itself. For articles such as filaments and films which are generally formed by melt extrusion anionic exchange or basic substances having good thermal stability are preferred.

Our invention provides improved, preferably coloured, articles formed wholly or in part of olefin polymers or copolymers, particularly those of ethylene and polypropylene which contain an inorganic base or salt having an alkaline reaction in water and to which a weakly acidic U.V. absorber has been added. Suitable bases and salts include oxides, hydroxides and fatty acid salts of the alkaline earth metals including magnesium. Salts of long chain fatty acids are particularly suitable in that the long hydrocarbon chain confers miscibility with the hydrocarbon polymer. Particularly suitable salts of this class are those with metals having colourless ions. Such salts are often referred to as "metal soaps." In an alternative embodiment of our invention the polyolefin composition contains anionic exchange substances such as are described by Amphlett, Metal Reviews No. 1, pages 419–677 (1956). This category includes substances such as hydroxyapatite and ampheteric hydroxides, such as those of tin and zinc.

For most effective distribution of the ultra-violet absorber we prefer that the absorber be soluble in the polyolefin and for maximum retention of the ultra-violet absorbing agent that the basic substance includes a metal which is capable of forming a chelate compound with said agent. The common metals which form chelates are for example those classified on page 182 of "Chemistry of the Metal Chelate Compounds," Martell and Calvin, published by Prentice Hall, New York, 1953.

In melt extrusion processes we prefer to use fatty acid salts of magnesium or zinc having paraffin chains of 6–20 carbon atoms in particular stearates. There are indications that metals such as zinc and magnesium which do not readily form chelates in aqueous solution are able to do so in polyolefines.

In our process ultra-violet absorbing agents are chosen which contain groups conferring an acidic nature on the absorber but of low ionisation constant as hereinbefore defined. The absorbing agents should, of course, be capable of penetrating into the polyolefin, of forming salts therein, and preferably also of forming chelate linkages with the metal additive present. Such properties are conferred by the presence of weakly acid anions containing sulphonamide, phenolic or carboxylic acid groups or in particular by groups capable of forming chelate structures for example dicarboxylic acids, hydroxyacids, nitro acids, keto acids, hydroxyaldehydes, hydroxyketones, diketones and diphenols. Chelating structures of this type are well known and are listed for example in Martell and Calvin (v. supra) p. 514, appendix 1. Among chelate forming ultra-violet absorbing agents we prefer to use the known hydroxy substituted benzophenones, in particular 2,2'-dihydroxy-4-octyloxybenzophenone or its nitrated derivative. The U.V. absorber may be added to the polyolefin before the shaping process but we prefer to add it to the shaped article itself during subsequent manufacture. In particular, the additive may be applied before, during or after dyebath treatment and we prefer to apply it during dyeing.

In general our stabilisation process is applicable to polyolefin compositions containing up to about ten percent by weight of anionic exchange or basic substance but the preferred level is between one and five percent. Up to about two percent by weight of U.V. absorber is preferably introduced.

In the presence of anionic exchange or basic substances, dyeings subsequently made on the polymer or articles thereof with acid dyestuffs, are much superior to those obtained with unmodified polymer, particularly in terms of depth of shade and wash or solvent fastness. If desired the range of acceptable dyestuffs may be extended to other classes of dyestuffs, such as mordant, basic and disperse dyes, by introducing the appropriate additive, to provide the required sites of affinity as described in the specification of our copending cognate United States application Serial No. 174,255 filed February 19, 1962. With addition of a U.V. absorber, in accordance with our invention, such dyeings are considerably faster to light.

In the examples provided for the purpose of illustrating the invention the following substances which had been milled and sieved to an average particle size below 10μ were tumbled in 5% weight concentration with powdered isotactic polypropylene:

(a) Magnesium oxide xerogel
(b) Calcium hydroxide
(c) Hydoxyapatite
(d) Zinc stearate
(e) Zinc naphthenate
(f) Manganese stearate
(g) Magnesium stearate
(h) Magnesium nonanoate The combined powders were melt spun at about 275° C. to yield fibres having birefringence of $3 \times 10^{-3}$, which were then drawn over a heated pin and plate to a draw ratio of 8/1.

The fibres prepared in this way were dyed by a 0.1% by weight solution or dispersion in water of the following dystuffs, under the conditions indicated:

(1) 1,2-dihydroxyanthraquinone, 100° C., 1 hour at pH 6.
(2) o-Aminophenol, diazotised and coupled with 3,5-dimethyl-phenyl-pyrazol-1-one, 1 hour at pH 6.
(3) The condensation product of 2 hydroxy-3:5-dichloro-benzaldehyde and o-aminophenol, 1 hour in neutral solution.
(4) p-Nitro benzeneazosalicylic acid, 1 hour at pH 5.
(5) o-Hydroxybenzeneazo-B-naphthol, 1 hour at pH 8.

The fibres were treated (a) before dyeing, (b) during dyeing and (c) after dyeing with 2% by weight of the fibre of 2,2'-dihydroxy-4-octyloxy benzophenone or methyl 5-octylsalicylate at the boil for 1 hour. In the treatment carried out before dyeing, microscopic cross section showed that the absorbers were dispersed throughout the fibre either, in the case of the particulate insoluble additives, as microscopic inserts or, in the case of the soluble additives, as a continuous dispersion. Boiling the thus treated fibre in water or acetone, did not extract the ultra-violet absorbers. In contrast, the ultra-violet absorbers introduced in a similar way to unmodified polypropylene were taken up to a much less extent and the absorbed substances were readily extracted by boiling water or organic solvent. Applying the U.V. absorbers before, during or after dyeing did not appreciably affect their efficiency. The results of these dyeings are compared by the light stability of the dyeings as in the attached table.

Table

| U.V. Absorber | Additive, percent Weight | Light Stability of Dyeings | | |
|---|---|---|---|---|
| | | 1:2 dihydroxy anthraquinone | o-Aminophenol and 3:5-methyl-phenyl pyrazolone | 2-hydroxy-dichloro-benzaldehyde/o-amino-phenol |
| None | 5% zinc stearate | 5 | 3-4 | 5 |
| Do | None | Dyeings too weak to assess. | | |
| 2,2'-dihydroxy-4-octyloxy-benzophenone: | | | | |
| (a) Before dyeing | 5% zinc stearate | 6 | 5 | 5-6 |
| (b) During dyeing | do | 6-7 | 5 | 6 |
| (c) After dyeing | do | 6 | 4-5 | 6 |
| None | 5% magnesium stearate | 4 | 3 | 3 |
| Methyl 5-octylsalicylate: | | | | |
| (a) Before dyeing | do | 5 | 3-4 | 4 |
| (b) During dyeing | do | 5 | 3-4 | 4-5 |
| (c) After dyeing | do | 4-5 | 4 | 4 |

NOTE.—The light fastness ratings are on the International 1-8 blue scale.

What we claim is:

1. A stabilized shaped article comprising a poly-α-olefin containing (1) a member selected from the group consisting of oxides and hydroxides of magnesium and zinc and salts of magnesium and zinc with a long chain fatty acid and (2) an acidic ultra-violet absorbing agent which absorbs light in the region between 3,500 and 4,000 angstrom units and which is less than ten percent ionized in normal aqueous solution, said light absorbing agent being a hydroxy substituted benzophenone.

2. A stabilized shaped article as set forth in claim 1 including a coloring material.

3. An article as claimed in claim 1 wherein the fatty acid contains 6–20 carbon atoms.

4. An article as claimed in claim 1 wherein the salt is zinc stearate.

5. An article as claimed in claim 1 wherein the salt is magnesium stearate.

6. An article as claimed in claim 1 wherein said ultra-violet absorbing agent is selected from the group consisting of 2,2'-dihydroxy-4-octyloxybenzophenone and its nitrated derivative.

7. An article as claimed in claim 1 wherein said ultra-violet absorbing agent is methyl 5-octylsalicylate.

8. An article according to claim 1 in which the poly-α-olefin is stereoregular polypropylene.

9. An article according to claim 1 in which the poly-α-olefin is isotactic polypropylene.

References Cited by the Examiner

UNITED STATES PATENTS

| 2,126,179 | 8/1938 | Duggan | 260—45.85 |
| 2,364,410 | 12/1944 | Whittaker | 260—45.85 |
| 2,481,307 | 9/1949 | Garner et al. | 260—45.85 |
| 2,890,193 | 6/1959 | Hardy | 260—45.95 |
| 2,933,474 | 4/1960 | Handy et al. | 260—45.75 |
| 2,964,495 | 12/1960 | Newland et al. | 260—45.75 |
| 2,972,596 | 2/1961 | Newland et al. | 260—45.75 |
| 2,976,259 | 3/1961 | Hardy et al. | 260—45.85 |
| 2,980,645 | 4/1961 | Newland et al. | 260—45.75 |

OTHER REFERENCES

Martell et al.: "Chemistry of the Metal Chelate Compounds," Prentice-Hall, Inc. (1953), QD 411 M38 C.4; pages 543 and 546.

LEON J. BERCOVITZ, *Primary Examiner.*

DONALD E. CZAJA, RALPH A. WHITE,
*Assistant Examiners.*